3,589,891
COMPOSITION FOR TOTAL WEED KILLING
Jacques Mocotte, St.-Didier-au-Mont-d'Or, and Francoise Prost, Villeurbanne, France, assignors to Progil, Paris, France
No Drawing. Filed Apr. 21, 1969, Ser. No. 818,106
Claims priority, application France, May 13, 1968, 151,634
Int. Cl. A01n 9/22
U.S. Cl. 71—94                                        5 Claims

ABSTRACT OF THE DISCLOSURE

An application, per hectare, of a mixture comprising 4 to 6 kg. of substituted urea, 4 to 8 kg. of phenoxy-acylated compound, 8 to 10 kg. of dichloropropionic acid (or derivatives) and 0.1 to 0.5 kg. of 4 amino-3,5,6-trichloropicolinic acid (or derivatives) gives very satisfactory results as a total herbicide.

---

The present invention relates to a new herbicidal mixture intended for total weed control of grounds and soils and for soil sterilization.

It is known that it is very difficult to obtain, under satisfactory conditions, a total and lasting weed control. To solve this problem it is necessary for the applied herbicide to have a great efficiency when used in non-prohibitively expensive quantities, to possess an activity spectrum large enough to destroy the different types of weeds growing on the ground to be treated and to produce some ground sterilization, in order to prevent a new plant appearance. It may easily be imagined that only one active substance does not generally answer at the same time all those requirements.

To meet this deficiency, it is possible to use mixtures of active ingredients having complementary activities. For example, a mixture containing N-(4-chloro-phenyl)-N', N'-dimethyl urea, sodium 2,2-dichloro propionate and phenoxy-acylated compounds has already been used; but in the opion of the experimenters themselves, such a mixture did not give very satisfactory results. Suggestions concerning weed controlling mixtures are also found in several patents; thus, in the French Pat. 1,357,687 dated Feb. 18, 1963 which claims a new class of compounds of aminotrichloropicolinic type—it is proposed to use a binary mixture constituted by an herbicide of the claimed type, used in a proportion corresponding to 0.6 to 17 kg./ha. and by another known ingredient, such as a substituted phenylurea, a phenoxy group compound, or a halogenated aliphatic acid used in a proportion of 0.12 to 4.53 kg./ha.

A new combination of active substances intended for total weed control and answering the requirements defined hereinabove has now been found.

In its most general form, the combination according to the invention is a quaternary association, containing: a substituted urea selected from N-(4-chlorophenyl)-N', N'-dimethyl urea or N-(3,4-dichlorophenyl)-N',N'-dimethyl urea; a phenoxy acylated compound chosen from the group of (2,4-dichlorophenoxy) acetic acid, (2,4,5-trichloro-phenoxy) acetic acid, (2-methyl-4-chlorophenoxy) acetic acid or their derivatives; 2-2-dichloro-propionic acid or its derivatives; and a small quantity of 4-amino-3,5,6-trichloropicolinic acid or its derivatives.

The constitutive elements of the associations according to the invention are compounds well known by themselves and easily available. They may be used according to the invention in their pure or commercial form. As derivatives of the contemplated acids are considered their salts, especially the salts of alkali metals, ammonium, amines, their esters of mono- or polyalcohols or phenols, their amides, etc.

In the associations according to the invention, the major quantity of the mixture is formed by the first three constituents, that is the substituted urea, the phenoxyacylated compound and the chlorinated fatty acid or its derivative. This quantity represents generally about 92 to 99.5% of the total weight of the active substance combination. Inside this total value, the respective quantities of the three constituents are not especially critical and may vary between large limits. For example it is possible to mix the three products in identical quantities. However, they are generally combined in such a way that the substituted urea is present in a quantity of 20 to 30% on the weight of the final quaternary mixture, the phenoxy-acylated compound in a quantity of 10 to 40%, the balance to 100, taking into account the 4-amino-3,5,6-trichloro picolinic acid, being constituted by dichloropropionic acid or its derivatives. According to an especially preferred form, percentages are established in such a way that chlorinated fatty acid represents at least 40% of final composition total weight.

The addition of a little quantity of 4-amino-3,5,6-trichloro-picolinic acid or of one of its derivatives, to the first three compounds, contemplated hereinabove is a characteristic factor of the herbicidal associations according to the invention. It gives to the composition its great efficiency and remanence. This product is used in a quantity which represents 0.5 to 8%—preferably 0.7 to 5% of quarternary mixture total weight. A proportion lower than 0.5% gives generally little result, while a value above 8% burdens uselessly the final product cost. For convenience, the percentages hereinabove may also be calculated on the basis of ternary mixtures containing 20 to 30% of substituted urea, 10 to 40% of phenoxy-acylated compound, 30 to 70% of dichloropropionic acid (or derivative).

The action of 4-amino-3,5,6-trichloro-picolinic acid or its derivatives, in the conditions according to the invention, is extremely surprsing since it goes against anterior art teachings. Indeed the small quantity used cannot by itself have any important herbicidal activity. Moreover, it is surprising to see that such an addition may give a notable herbicidal efficiency to a mixture of substituted urea, phenoxy-acylated compound and of a dichloro-propionic acid derivative which, according to the previous tests mentioned above, had not revealed itself as being a satisfactory one. It is possible to think the 4-amino-3,5,6-trichloro-picolinic acid used in the compositions of the invention has not an additive herbitical action, but rather an activation effect on the other mixture constitutents.

The quantities of the associations according to the invention to be applied on the grounds to be treated may vary in some limits with regard to various factors such as application time, growing stage of the plants to be destroyed and climate conditions. Quantities comprised between 12 and 24 kg./ha. fit generally well in all the cases. For example, excellent results have been obtained with applications of 16 kg./ha. of a mixture comprising:

24% of N-(3,4-dichlorophenyl)-N'N'-dimethyl urea
24% of (2,4-dichlorophenoxy) acetic acid
50% of sodium 2,2-dichloro propionate
2% of 4-amino-3,5,6-trichloropicolinic acid or with applications of 20 kg./ha. of a mixture comprising:

25% of N-(4-chlorophenyl)-N'N'-dimethyl urea
30% of the sodium salt of (2-methyl-4-chloro-phenoxy) acetic acid
43.5% of sodium-2,2-dichloro propionate
1.5% of the potassium salt of 4-amino-3,5,6-trichloro picolinic acid.

To express this in other words, it is also possible to tell that, in a general way, an application, per hectare, of a mixture comprising 4 to 6 kg. of substituted urea, 4 to 8 kg. of phenoxy-acylated compound, 8 to 10 kg. of dichloropropionic acid (or derivatives) and 0.1 to 0.5 kg. of 4-amino-3,5,6-trichloro picolinic acid (or derivatives) gives very satisfactory results as a total herbicide.

The herbicidal associations according to the invention may be used such as they are or in mixture with known inert adjuvants, as, for example, solid fillers, solvents, emulsifiers, etc. They may be used according to the usual formulations, that is, in the form of wettable powders, granules, solutions, suspensions, emulsions, etc.

The herbicidal compositions according to the invention fit perfectly for the weed control of the grounds infested by the most varied plants, different by their nature and their resistance; they destroy both deep-rooted plants as well as grasses having surface roots. Moreover, they are characterized by a great remanence and may still prevent weed growing eighteen months after their application.

The examples hereinafter, given in an illustrative way, emphasize the qualities of the compositions according to the invention.

EXAMPLE 1

In May the following composition was sprayed on earth lots situated in the open fields, in a quantity corresponding to 20,000 l./ha.; the composition comprised a water suspension of a mixture according to the invention. This mixture which was applied according to a rate of active ingredients equal to 16.3 kg./ha., was composed of:

4 kg. of N-(3,4-dichloro-phenyl)-N'N'-dimethyl urea
4 kg. of (2,4-dichloro-phenoxy)-acetic acid
8 kg. of sodium-2,2-dichloro propionate
0.3 kg. of potassium salt of 4 - amino - 3,5,6 - trichloro picolinic acid.

The lots were infested by numerous weeds, especially quack grass (Agropyrum sp.), large crab grass (*Digitaria Sanguinalis* L.), orchard grass (*Dactylis glomerata* L.), blue grass (Poa sp.), tansy ragwort (*Seneci Jacobaea* L.), wild carrot (*Daucus carota* L.), buckhorn plantain (*Plantago Lanceolata* L.), common yarrow (*Achillaca millefolium* L.), field bindweed (*Convolvulus arvensis* L.), sorrel and red sorrel (*Rumex acetosa* and *Rumex acetosella* L.), dandelion (*Taraxacum dens-leonis* desf.), common mullein (*Verbascum thapsus* L.) and creeping thistle (*Eryngium capestre* L.).

At the end of 25 to 30 days a total weed control of the treated lots was noted. The following October, that is about six months after the treatment, no weed appearance had been noted, while eighteen months after product application, only a weak growing of buckhorn plantain was noted.

EXAMPLE 2

To emphasize the surprising effect of the associations according to the invention and their superiority with respect to ternary and binary mixtures, earth lots were treated in September with aqueous suspensions containing the types of active substances indicated hereinunder, used in the given quantities per hectare.

Product A: 4-amino-3,5,6-trichloro picolinic acid (proportion 0.3 kg./ha.).

Product B: potassium salt of 4-amino-3,5,6-trichloro picolinic acid (proportion 0.5 kg./ha.).

Product C: binary mixture of 8 kg. of N-(3,4-dichlorophenyl)-N'N'-dimethyl urea and 8 kg. of (2,4-dichlorophenoxy)-acetic acid (proportion: 16 kg./ha.).

Product D: ternary mixture of 4 kg. of N-(3,4-dichlorophenyl)-N'N'-dimethyl urea 4 kg. of (2,4-dichloro-phenoxy)-acetic acid and 8 kg. of sodium 2,2-dichloro propionate (proportion: 16 kg./ha.).

Product E: quaternary mixture of 4 kg. of N-(3,4-dichloro-phenyl)-N'N'-dimethyl urea, 4 kg. of (2,4-dichlorophenoxy)-acetic acid, 8 kg. of sodium 2,2-dichloro propionate and 0.3 kg. of 4 amino-3,5,6-trichloro picolinic acid (proportion: 16.3 kg./ha.).

Product F: quaternary mixture of 4 kg. of N-(4-chlorophenyl)-N'N'-dimethyl urea, 4 kg. of sodium salt of (2,4,5-trichloro-phenoxy)-acetic acid, 7.5 kg. of sodium dichloropropionate and 0.5 kg. of potassium salt of 4-amino-3,5,6-trichloro picolinic acid (proportion: 16 kg./ha.).

Then comparative surveys of the plants present in treated lots and in reference lots were made.

So, it has been possible to determine destruction percentage caused by the different types of the tested products. The obtained results are given in the table hereinafter:

TABLE 1.—PERCENTAGE OF PLANT DESTRUCTION IN DIFFERENT TIMES AFTER APPLICATION

| | Times | | | | | | | |
|---|---|---|---|---|---|---|---|---|
| | 3 months | | 5 months | | 9 months | | 18 months | |
| Plants | Monocotyledons | Dicotyledons | Monocotyledons | Dicotyledons | Monocotyledons | Dicotyledons | Monocotyledons | Dicotyledons |
| Test products: | | | | | | | | |
| A | 0 | 10 | 0 | 15 | 0 | 10 | 0 | 0 |
| B | 0 | 40 | 5 | 30 | 5 | 10 | 0 | 5 |
| C | 10 | 30 | 10 | 30 | 10 | 30 | 10 | 25 |
| D | 85 | 45 | 85 | 45 | 85 | 45 | 80 | 20 |
| E | 100 | 100 | 100 | 100 | 100 | 100 | 95 | 95 |
| F | 100 | 100 | 100 | 100 | 100 | 95 | 90 | 95 |

The results hereinabove show that the efficiency of mixtures according to the invention does not arise only from the addition of products A+D or B+D activity. Moreover, they emphasize the superiority of the compositions according to the invention with regard to the binary and ternary mixtures C and D.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents.

What is claimed is:

1. In a composition for total weed killing which consists essentially of, as active ingredients, in a major proportion, a ternary mixture consisting of (1) a substituted urea of N(4-chlorophenyl)-N'N'-dimethyl-urea or N-(3,4-dichlorophenyl)-N'N'-dimethyl-urea, (2) a phenoxy-acylated compound of (2,4-dichlorophenoxy)-acetic acid, (2,4,5-trichloro-phenoxy)-acetic acid, (2-methyl-4-chlorophenoxy)-acetic acid or their derivatives, and (3) a dichloro-propionic compound of 2,2-dichloropropionic acid or its derivatives, the improvement wherein said composition further comprises, in a minor proportion, 4-amino-3,5,6-trichloro-picolinic acid or its derivatives, said trichloro-picolinic compound being present in a quantity of 0.5% to 8% of the total weight of all four compounds.

2. A composition of matter according to claim 1 in which said 4-amino-3,5,6-trichloro-picolinic acid or derivatives is present in a quantity of 0.7 to 5% of the total weight of the four compounds.

3. A composition according to claim 1 wherein said substituted urea is present as 20–30% of said active composition and said phenoxy-acylated compound is present as 10–40% of said active composition.

4. A composition according to claim 1 wherein said dichloro propionic compound comprises at least 40% of said active ingredients.

5. A method of weed killing and soil sterilization using the composition of claim 1 comprising applying to the soil per hectare said mixture of 4–6 kg. of said substituted urea, 4–8 kg. of said phenoxy-acylated compound, 8–10 kg. of said dichloro propionic compound and 0.1–0.5 kg. of said picolinic compound.

References Cited

UNITED STATES PATENTS

| | | | |
|---|---|---|---|
| 3,285,925 | 11/1966 | Johnston et al. | 71—92 |
| 3,424,571 | 1/1969 | Bondouy et al. | 71—120X |

JAMES O. THOMAS, Jr., Primary Examiner

U.S. Cl. X.R.

71—113, 116, 117, 120